United States Patent Office 3,133,821
Patented May 19, 1964

3,133,821
METHOD OF MAKING SILICA INSULATING MATERIAL
Harvey E. Alford, Amherst, and Franklin Veatch, Lyndhurst, Ohio, assignors to The Standard Oil Company, Cleveland, Ohio, a corporation of Ohio
No Drawing. Filed Oct. 13, 1961, Ser. No. 144,838
2 Claims. (Cl. 106—40)

The present invention relates to an insulating material having a low tangent of dielectric loss and to a method of preparing this material. The insulating material of this invention is produced from silica in the form of discrete hollow microspheres having smooth walls, a substantial portion of which are hole-free.

Because of the inherent properties possessed by the materials produced in accordance with this invention, they are particularly useful in the manufacture of protective housings for high frequency electronic equipment such as radar installations. Such housings may be produced by intimately combining the microspheres of this invention with plastic materials in accordance with the conventional techniques to provide a solid mass possessing excellent dielectric, strength and vibration resisting characteristics and being highly transparent to the transmission of high frequency microwaves of radar origin with a minimum of distortion.

In brief, the process of the present invention comprises the following steps: (1) mixing a silica sol with a polyhydroxy organic compound; (2) subjecting the aforesaid mixture to a controlled drying program; (3) reducing the dried mixture to a pre-determined particle size range; (4) introducing said dried and ground mixture into a furnace maintained at a pre-selected temperature sufficient to form microspheres from silica, and finally (5) collecting said microspheres. The product produced by this process also falls within the scope of the present invention.

The silica which is employed as the raw material in the process of this invention should be in a form which may be readily mixed with the polyhydroxy organic compound. A particularly suitable source of silica is an aqueous silica sol. However, an important and critical limitation on the composition of the sol is that it must not contain an appreciable amount of alkali metal since the presence of such a metal in the final product would have a detrimental effect on the electrical properties of the product. Hence, the silica sol must not contain more than about 0.4% by weight of alkali metal (as measured by the $Na_2O$ content). Such a silica sol is commercially available under the trade name of "Ludox HS." Although the silica content of sol may vary, an aqueous sol containing about 30% by weight of silica appears to be optimum since it has a viscosity such that it may readily blend with the polyhydroxy organic compound.

As the polyhydroxy organic compound which is employed in the process of this invention, glycerin, butanediols, polypropylene glycol and hexane triols are illustrative and, of these, glycerin gives the best results. The function of the polyhydroxy organic compound is to provide a material which will form a gas under the conditions of the microsphere formation and thereby facilitate the formation of microspheres from the silica. The volatility of the polyhydroxy organic compound should be such that it will not be driven off during the drying step which is described hereinafter. It is for the latter reason that ethylene glycol which has a relatively low volatility is not suitable for the purposes of this invention, and only those polyhydroxy organic compounds containing at least three carbon atoms per molecule are contemplated within the scope of this invention. In general, the amount of the polyhydroxy organic compound added to the silica should be in the range of 0.5 to 5.0% by weight based on silica and a concentration of about 1% by weight appears to give the optimum results.

After the organic polyol and the silica sol have been thoroughly mixed, the mixture is then dried in a conventional drying oven, which is maintained at a temperature in the range of 250° F. and 600° F. Of course, the drying time will vary depending upon the quantity of material which is being dried, but short times at high temperatures seem to give the best results. For example, eight hours at 500° F. will provide an excellent product.

When the mixture has been dried in accordance with the foregoing description, the material is then reduced in size until all of the particles in the mixture are smaller than 100 microns in size, and preferably less than 75 microns. In general, the dried material is extremely friable and the size reduction may be conveniently carried out in conventional grinding equipment.

The feed prepared in accordance with the foregoing description is next introduced into a furnace where the silica particles are expanded into hollow microspheres. The ideal operating conditions for such a furnace permit the feed particles to remain in the hot zone for a time just sufficient to form a tough outer skin on the silica particle and convert substantially all the latent gas material associated with the particle into a gas so that coincident with the fusing of the outer shell of the particle the gas is available to fill the hollow space formed in the interior of the particle. It is then necessary to remove the hollow sphere from the hot zone at the point of its maximum expansion so that the sphere will not rupture.

A number of furnace arrangements are disclosed in the prior art by means of which inorganic particles may be converted to hollow microspheres. All of these may be employed in the process of the present invention and no claim is made to the expansion step per se. One very satisfactory furnace arrangement is one in which the silica particles are introduced together with the combustion gases at the bottom of an up-draft furnace. In this arrangement the microspheres rise to the top of the furnace as they are formed where they are removed to a cooling zone and finally to a collection zone. The collection zone will in general comprise conventional collecting means such as a cyclone collection system or a bag filter.

The temperature at which the furnace is operated is important and in general it is necessary to operate the furnace at a temperature in the range of 2300° F. to 3000° F. in order to convert the silica into the desired microspheres. One of the more surprising aspects of this invention is that the silica may be expanded into microspheres at temperatures considerably below the melting point of silica which is about 3115° F. The explanation for this phenomenon is not known and it is doubted that crystal structure can account for it since X-ray studies have shown that both the feed material and the product are substantially amorphous, i.e., non-crystalline. Notwithstanding the absence of an explanation this surprising phenomenon has been observed and it may be that the polyhydroxy organic compound is in some way responsible. In order to achieve the high furnace temperatures necessary to the formation of the silica microspheres, a natural gas fuel may not provide a high enough temperature, and, in that event, propane may be used as the fuel.

The properties of the final product will vary somewhat depending upon the particular polyhydroxy organic compound employed and the process operating conditions. However, in general, the product of the process of this invention will have an average true density on the order of 1.0 g./cc. to 1.2 g./cc. and at least 40% of the product can be floated on water. That portion of the product which floats will, of course, have a much lower true density usually on the order of about 0.6 g./cc. to 0.8 g./cc. The dielectric loss tangent of the product will be less than about 0.002 at 8600 megacycles and in most instances it will be below 0.0015 at the same frequency.

In order to illustrate the process of this invention, the following example is given which also represents the preferred embodiment of the invention.

A feed mixture was prepared by mixing 100 lbs. of an aqueous silica sol containing 30% by weight of silica (0.33% by weight $Na_2O$) and 1 lb. of glycerin. This mixture was then dried in an oven maintained at 570° F. for four hours. The dried mixture was then reduced in size by grinding until all of the material was reduced to particles smaller than 74 microns.

The dried and ground feed was then introduced at the bottom of a conventional propane-fired up-draft furnace. The furnace was maintained at a temperature of 2400° F. The product consisting of the silica microspheres was removed from the top of the furnace and, after cooling with a water spray, it was collected in a conventional cyclone separator.

Analysis of the product revealed the following properties:

| | |
|---|---|
| True density g./cc. | 1.02 |
| Volume percent which floats on water | 52 |
| Density of floaters g./cc. | 0.69 |
| Dielectric loss tangent | 0.0013 |

Various modifications of the process will be obvious to those skilled in the art, and this application for Letters Patent is intended to cover all such modifications as would reasonably fall within the scope of the appended claims.

We claim:

1. A process for the manufacture of a silica insulating material having a dielectric loss tangent below 0.002 at 8600 megacycles comprising the steps of (1) preparing a feed solution by mixing a minor amount of a gasifying agent in the form of a polyhydroxy organic compound containing at least three carbon atoms per molecule with a major amount of a silica sol containing less than 0.4% by weight alkali metal, (2) drying said solution to a substantially dry state at an oven temperature in the range of 250° F. to 600° F., (3) grinding the dry mass obtained in the preceding step so as to reduce said mass to particles below about 100 microns, (4) introducing said particles into a furnace wherein the temperature is maintained in the range between 2300° F. and 3000° F. whereby said particles are converted, at a temperature considerably below the melting point of silica into discrete hollow silica microspheres at least 40% of which have smooth hole-free walls, and finally (5) removing said microspheres from said furnace and collecting same.

2. A process for the manufacture of a silica insulating material having a dielectric loss tangent below 0.002 at 8600 megacycles comprising the steps of (1) preparing a feed solution by mixing a minor amount of glycerine as a gasifying agent with a major amount of an aqueous silica sol containing less than 0.4% by weight alkali metal, (2) drying said solution to a substantially dry state at an oven temperature in the range of 250° F. to 600° F., (3) grinding the dry mass obtained in the preceding step so as to reduce said mass to particles bleow about 75 microns in size, (4) introducing said particles into a furnace wherein the temperature is maintained at about 2400° F. whereby said particles are converted, at a temperature considerably below the melting point of silica into hollow silica microspheres at least 40% of which have smooth hole-free walls, and finally (5) removing said microspheres from said furnace and collecting same.

References Cited in the file of this patent

UNITED STATES PATENTS

| | | |
|---|---|---|
| 2,151,083 | Christensen et al. | Mar. 21, 1939 |
| 2,883,347 | Fisher et al. | Apr. 21, 1959 |
| 2,978,340 | Veatch et al. | Apr. 4, 1961 |

OTHER REFERENCES

Iler: "The Colloid Chemistry of Silica and Silicates," published 1955 by Cornell University Press, Ithaca, N.Y. (pages 269–270).